United States Patent [19]

Henry

[11] Patent Number: 4,473,335

[45] Date of Patent: Sep. 25, 1984

[54] HELICOPTER HUB SYSTEM

[75] Inventor: Howard G. Henry, Scottsdale, Ariz.

[73] Assignee: Adroit Engineering Company, Scottsdale, Ariz.

[21] Appl. No.: 275,247

[22] Filed: Jun. 19, 1981

[51] Int. Cl.³ .............................................. B64C 27/18
[52] U.S. Cl. .................................. 416/20 A; 416/148
[58] Field of Search .................. 416/20 R, 20 A, 102, 416/148

[56] References Cited

U.S. PATENT DOCUMENTS

| | | | |
|---|---|---|---|
| 2,429,646 | 10/1947 | Pullin | 416/20 A |
| 2,454,040 | 11/1948 | Dalton | 416/20 A |
| 3,370,809 | 2/1968 | Leoni | 416/20 A X |
| 3,556,674 | 1/1971 | Foote | 416/20 |
| 3,830,588 | 8/1974 | Nagler | 416/20 A |
| 3,862,811 | 1/1975 | Bernaerts | 416/20 |

FOREIGN PATENT DOCUMENTS

| | | | |
|---|---|---|---|
| 884751 | 11/1971 | Canada | 416/20 A |
| 687481 | 8/1930 | France | 416/20 A |
| 579586 | 8/1946 | United Kingdom | 416/148 |

*Primary Examiner*—Everette A. Powell, Jr.
*Attorney, Agent, or Firm*—LaValle D. Ptak

[57] ABSTRACT

A helicopter rotor hub for use in an air-driven helicopter comprises a section of a spherical stainless steel ball attached to the end of a hollow rotor shaft. An air compressor within the helicopter supplies air to the hollow rotor shaft which discharges through it to hollow rotor blades which have discharge nozzles at the trailing edges on their tips. The sole support bearing for the blades is in the form of a cup-shaped concave graphite bearing which engages the stainless steel ball and to which the rotor blades are attached. The graphite provides a lubrication-free bearing surface and also provides a seal against air leakage.

28 Claims, 10 Drawing Figures

HELICOPTER HUB SYSTEM

BACKGROUND OF THE INVENTION

This invention relates to helicopters, and more specifically, to air-driven helicopters in which a flow of air is conveyed through a central hollow rotor shaft through hollow rotors to exit at the tips of each of the rotor blades to provide the necessary rotation of the rotor blades.

The most common construction for helicopters which historically has been used and which generally is employed both in commercial and military helicopters at the present time is to cause the rotor of the helicopter to rotate by mechanical interconnections of the rotor to an engine through various types of mechanical transmissions. Several disadvantages are inherent in such conventional systems, whether a reciprocating internal combustion engine is used as the primary power source, or whether a turbine engine is employed. A primary disadvantage is that significant high torque loads are placed on the structure which is used to support the vertical shaft connecting the rotor blades with the engine. This torque must be counteracted to prevent a counterrotation of the body of the helicopter with respect to the rotor. Typically, this is accomplished by the provision of an additional small tail rotor which is mounted in a vertical plane with its hub at right angles to the helicopter body. The speed of rotation or force which is applied by the tail rotor to the body of the helicopter must be coordinated with the driving power applied to the main rotor blades in order to obtain stable operation of the helicopter. An enormous amount of stress is placed on the body members of the helicopter as well as the transmission or drive chanin used to interconnect the engine with both the main rotor and the tail rotor.

Another significant disadvantage of such conventional helicopter structures, as described above, is in the relatively large number of rotating and moving parts which must be utilized to drive the two rotors. Many bearings, operating under significant stress (rotational, centrifugal, and the like), must be employed. These bearings are costly and require frequent and expensive maintenance.

Not only must the hub design for the rotor be such as to permit rotation about the vertical rotor shaft, but the hub also must be capable of angular movement in vertical planes passing through the vertical rotor shaft. Typically, this angular movement is up to ten or fifteen degrees. To effect such angular control, the rotor blades are tilted through what is known as a swash plate at the hub. The swash plate then is connected to manual controls within the helicopter in a known manner through a plurality of control rods. These control rods are independent of the rotating vertical rotor and are fully self-supporting since the control system cannot be mechanically connected to the rotating rotor.

Conventional mechanically linked rotor drive mechanisms also are sensitive to slight imbalances between the various rotor blades which cause the center of gravity of the rotor blades to be different from the central axis of the rotating rotor. This also places considerable structural loads upon the bearings which support the rotating rotor. In addition, it is difficult to support the rotating rotor very near the rotor hub because of all of the various vearings, support structure, and the like. Generally, the centrifugal force provided by the blades of the rotor is concentrated at a point above the hub which results in further stress on the hub and the rotor support structure.

Because of the large number of moving parts subjected to considerable stress in a conventional helicopter, the maintenance and repair hours considerably exceed the actual flight hours of the helicopter. Consequently, maintenance is a significant cost factor to be considered for the operation of such a conventional helicopter.

To reduce the mechanical and structural problems which are inherent in conventional helicopter systems as described above, other approaches have been attempted in the past. One such approach was to place a jet engine or turbine at the tip of each of the rotor blades. This removed all of the structural requirements placed upon the vertical rotor shaft in conjunction with the interconnection of the rotor with an engine located within the body of the helicopter. The rotor blades then simply were connected to a simple rotating disk having its center at the vertical rotor support shaft. Significant fuel delivery problems were substituted for the simplification of the mechanical drive, however. It became necessary to transport the fuel from the helicopter body through the rotor support shaft and into the rotating rotor blades to the engines. An extreme safety hazzard was present because of the high volatility of the fuel and leaks between the hub at the non-rotating rotor shaft and the rotating rotor blade hub were difficult to prevent. In addition, the centrifugal force acting upon the fuel due to the rotating rotor blades changed depending upon the speed of the blades, resulting in a too rich or too lean fuel mixture supplied to the engine. Consequently, power failures occurred.

To take advantage of the simplified structural requirements with the rotor blade acting as a simple rotating disk but without the problems of conveying volatile fuel to jet engines mounted on the tips of the rotor blades, various designs utilizing the flow of pressurized air delivered through a hollow rotor shaft to hollow blades have been developed. In systems using this type of design, a flow of air passes through the rotor blades to nozzles located at the tips of each of the blades and directed rearwardly. Consequently, air discharging through the nozzles results in reactive force in the opposite direction and rotates the blade about the hub. A variety of attempts to develop practical helicopters utilizing this concept of an air-driven rotor have been made in the past.

One of the more recent air-driven helicopter systems is disclosed in the patent to Nagler, U.S. Pat. No. 3,830,588. This patent discloses an air-driven helicopter which has a hollow rotor shaft connected to an air compressor to convey a flow of air through the rotor shaft to the rotor hub. The hub rotates about the fixed shaft on ball bearings, with the center line of the rotor blades concentrating a center of force which is primarily above the bearings. Separate air seals and a separate spherical bearing to handle the tilt of the rotor blades is required. In addition, flexible bellows are provided to accomodate the tilt functions of the rotors effected by the swash plate. Because of the relatively high temperature of the compressed air which is used in such a helicopter, the ball bearings and the air seals of the system disclosed in this patent require frequent maintenance.

A system which is similar in some respects to the Nagler system is disclosed in the patent to Abramopaulos, number 3,612,441. This patent has the rotor rotating on ball bearings located above the center of force, with a spherical bearing separately utilized to handle the tilt of the rotor assembly. The spherical bearing also, apparently, is used to effect the air seal to prevent the compressed air from leaking from the system during operation. This patent also is subject to the shortcomings of any system using ball bearings in the high temperature environment which results in lubrication problems and frequent maintenance. In addition, because of the arrangement of parts, tight sealing off of the air to prevent any leakage of the air used to drive the rotor is difficult.

Three other patents which are directed to air-driven helicopter rotors and which are typical of approaches taken in the prior art to implement this technique are the patents to Laufer, U.S. Pat. No. 3,073,394, Ryan et al, U.S. Pat. No. 3,159,360, and Pullin, U.S. Pat. No. 2,429,646. All three of the systems disclosed in these patents use ball bearings at the hub to handle the rotation of the hub relative to the rotor shaft fixed to the air frame of the helicopter. In Laufer, a large separate sealing ring is employed along with flexible air pipes to accommodate the rotor tilt. The separate sealing ring and the ball bearings are subject to the disadvantages noted above in conjunction with the Nagler and Abramopaulos systems.

In Ryan, as in Laufer, a large separate sealing ring is employed along with the ball bearings at the hub. The Pullin patent passes the compressed air through a fixed sphere with an annular slot in it aligned with the ends of the rotating rotor blades. Separate gas sealing rings are employed to prevent leakage of the high pressure air from the rotor hub assembly.

In the Laufer, Ryan and Pullin patents, the center of force of the rotating rotor blades is generally aligned with the hub; so that the disadvantages of the location of the center of force above or below the bearings which is present in the Nagler and the Abramopaulos patents is not present in these three systems. All of these systems, however, still are subject to the significant disadvantages encountered in the lubrication of ball bearings in the high temperature regions encountered and in the provision of efficient and long-lasting seals to prevent leakage of the air through the hub/rotor interface.

Other prior art patents for air-driven helicopter rotors, which are subject to the same disadvantages present in the systems described specifically above, are found in the patents to Laufer, U.S. Pat. No. 2,845,131; Andrews, U.S. Pat. No. 3,119,577; Leoni, U.S. Pat. No. 3,370,809; French Pat. No. 1,002,007 (October 1951); and Italian Pat. No. 419,603 (April 1947).

The concept of a compressed air-driven helicopter rotor theoretically appears to be an ideal concept for powering a helicopter. By causing the reactive forces to take place at the tips of the rotor blades, no counterrotating stress is applied from the rotor to the body of the helicopter; so that the additional tail rotor which is conventionally used is not necessary. In addition, a truly free-wheeling rotor may be employed without the necessity of any complex clutch arrangements, or the like; so that in the event of a power failure, the rotor immediately is able to go into an auto rotation mode to permit safe landing of the helicopter. It is desirable, therefore, to provide a hub mechanism or hub system which is not subject to the disadvantages of the prior art, particularly with respect to the bearings and air seals; so that the inherent advantages of an air-driven helicopter rotor may be commercially realized.

SUMMARY OF THE INVENTION

Therefore, it is an object of this invention to provide an improved air-driven helicopter.

It is another object of this invention to provide an improved rotor hub system for an air-driven helicopter.

It is an additional object of this invention to provide a simplified hub system for an air-driven helicopter rotor.

It is a further object of this invention to provide a low maintenance hub system for an air-driven helicopter rotor.

It is still a further object of this invention to provide an improved rotor hub system for an air-driven helicopter rotor utilizing a self-lubricating hub bearing system.

It is yet an additional object of this invention to provide an improved rotor hub system for an air-driven helicopter rotor in which the hub bearing serves the dual function of providing an air seal as well as the rotor bearing function.

In a preferred embodiment of the invention, an air-driven helicopter has a hollow rotor shaft which is rigidly mounted in the air frame and extends upwardly from the air frame. A rotor hub system is attached to the rotor shaft for supporting a set of hollow rotor blades and for conveying a flow of pressurized air from the shaft to the blades from which the air exits at the tip to rotate the rotor. An air pressure source is mounted in the air frame for delivering a flow of pressurized air to the hollow rotor shaft. In this air-driven helicopter system, the rotor hub system comprises a hollow spherical section support member attached to the end of the hollow rotor shaft to permit the air flow to pass through it from the rotor shaft. A combined rotor support, seal and bearing member has an internal concave spherical surface matingly engaging the external surface of the spherical section support member for rotation about the spherical section support member. The rotor blades then are attached to the rotor support bearing member for rotation with it. At least one of the spherical section support member and the rotor support bearing member is made of a self-lubricating bearing material.

In a more specific embodiment of the invention, the rotor support bearing member is made of high density graphite which is capable of withstanding the relatively high temperatures of the compressed air flowing through the rotor hub assembly and which further is self-lubricating and provides an air-tight seal between the hollow spherical section support member and the rotor support bearing member. Consequently, a simplified, relatively low maintenance rotor hub system results.

DETAILED DESCRIPTION

In the drawings, the same reference numbers are used throughout the several Figures to designate the same or similar components.

Reference first of all should be made to FIGS. 1, 2, 3 and 4. As illustrated in these Figures, the hub assembly or hub system for an air-driven helicopter in accordance with a preferred embodiment of the invention is shown. Since the air frame, compressed air supply, and rotor assembly of the helicopter are of the type employed in air driven helicopters of the various general types described above in the "Background of the Invention" section, those portions of the helicopter are not shown.

The hub assembly of FIGS. 1 through 4, however, is significantly different from the various hub assemblies previously used. The assembly itself includes a plenum chamber housing 10 which is used to confine and direct air flowing upward through a hollow rotor shaft 11 from a source of compressed air (not shown), which typically is provided by a turbine engine located within the main body or air frame of the helicopter. The air passing upward through the hollow rotor shaft 11 is directed out of the upper end of the rotor shaft into the upper portion of the plenum chamber 10 into the open ends of hollow rotor blades, two of which, 14 and 15, are illustrated in FIGS. 1 through 4. Although a helicopter rotor structure having two blades is illustrated, it is to be understood that three, four or a greater number of blades may be employed if desired. In fact, in many commercial helicopter configurations, three-bladed and four-bladed rotors are common. The principles of the invention are the same irrespective of the number of blades used, and the two-bladed structure which is illustrated is not to be considered as limiting.

Figure 1:
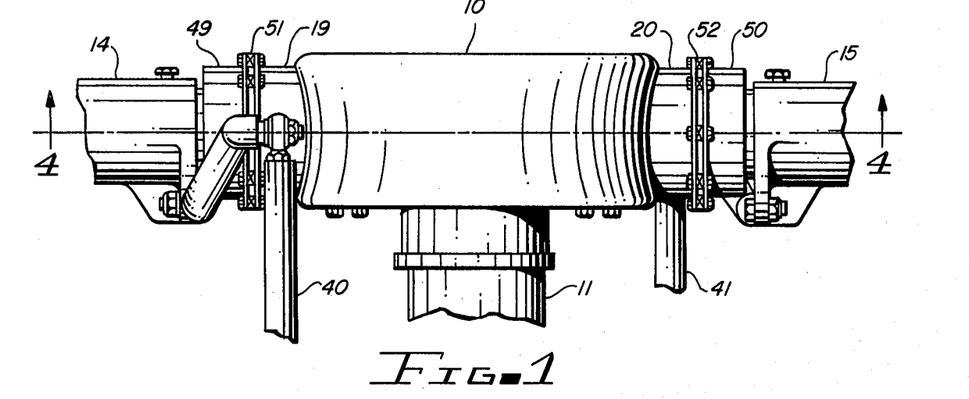
FIG. 1 is a side view of the exterior of a rotor hub assembly in accordance with a preferred embodiment of the invention illustrating the attachment of two rotor blades at rest 180 degrees apart and showing a portion of the swash plate control arm connections thereto.
Figures 2, 3, 6:
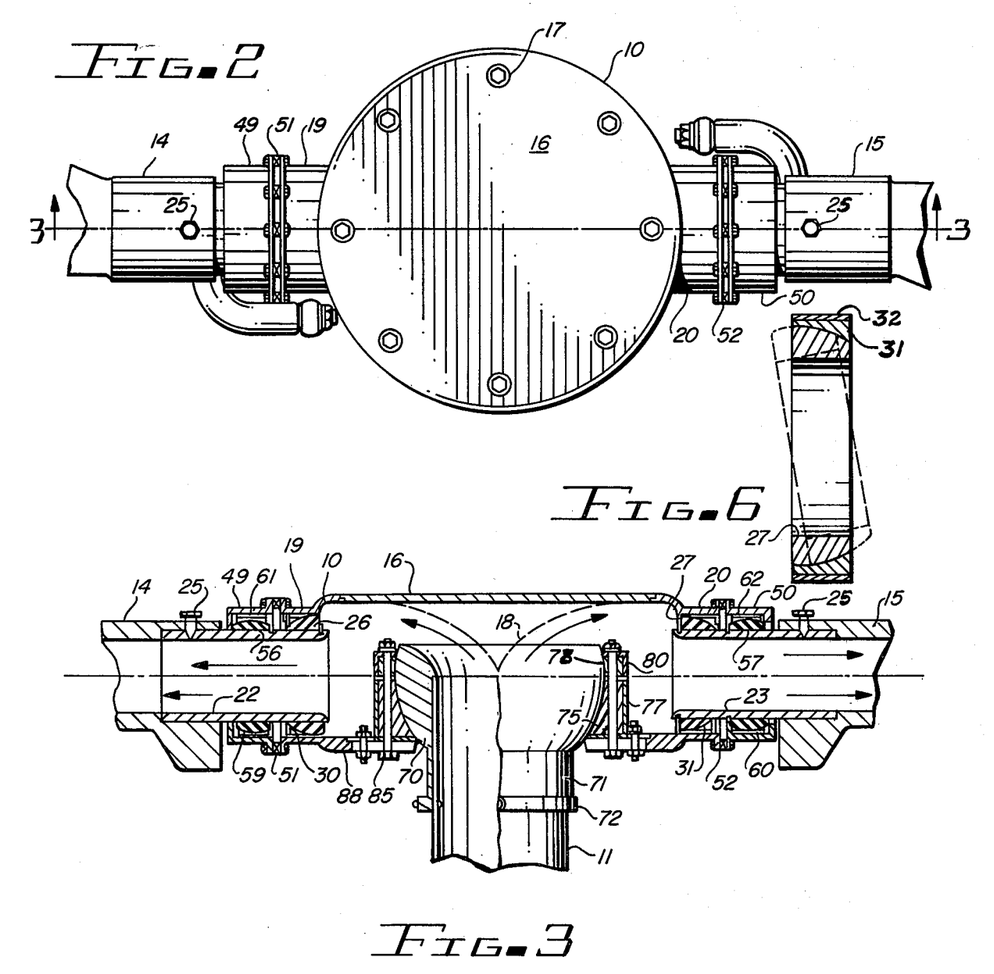
FIG. 2 is a top view of the assembly shown in FIG. 1.
FIG. 3 is a cross-sectional view of the hub assembly of FIGS. 1 and 2 taken along the line 3—3 of FIG. 2.
FIGS. 6 and 7 are enlarged details of a portion of the structure shown in FIGS. 1 through 4.
Figure 4:
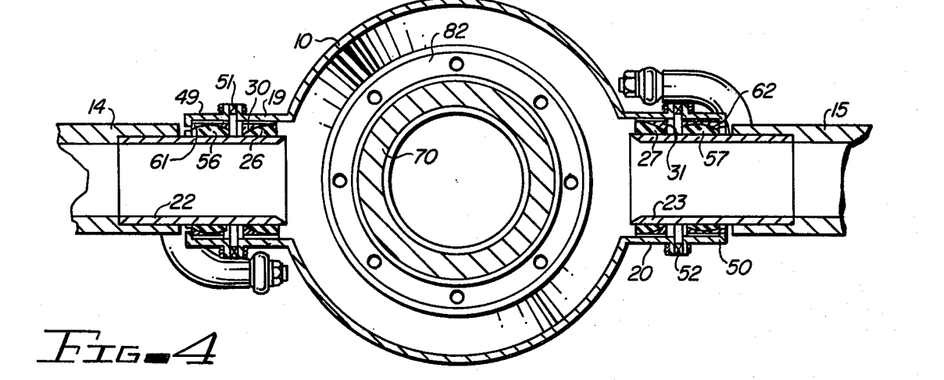
FIG. 4 is a sectional view taken along the line 4—4 of FIG. 1.

The top side of the plenum chamber 10 is closed by a removable plate 16, shown most clearly in FIGS. 2 and 3, which may be held in place by means of bolts 17 or in any other suitable manner to permit its removal for installation and maintenance of the rotor hub assembly on the hollow rotor shaft 11. By making the plate 16 with a diameter as large as possible, access to the interior of the chamber 10 for assembly and for subsequent maintenance and inspection purposes is greatly facilitated.

The helicopter rotor blades 14 and 15 are rotatably mounted for limited rotation about their axes in a pair of sleeve extensions 19 and 20, respectively, which are formed as an integral part of the plenum chamber 10. These extensions 19 and 20 may be separately fabricated and then welded or otherwise securely attached to the plenum chamber 10, but the resultant structure is that the extensions 19 and 20 become an integral part of the plenum chamber 10 for rotational attachment of the rotor blades.

The attachment of the rotor blades 14 and 15 is provided by means of cylindrical sleeve members 22 and 23, which extend from the inner-most edge of the extensions 19 and 20, respectively, in the plenum chamber 10, to the inside edges of the hollow rotor blades 14 and 15. This is shown most clearly in FIGS. 3, 9 and 10. The cylindrical members 22 and 23 have the respective rotor blades 14 and 15 attached to them by means of suitable fasteners, such as the set screws 25 which are illustrated in detail in FIG. 3. A number of these set screws may be provided around the periphery of the end of the rotors 14 and 15. Alternatively, other means of attachment of the rotor blades 14 and 15 may be effected following the present practice of the art. It is desirable to have the attachment be one which permits easy removal and replacement of a rotor blade in the event it should become damaged or require replacement for any reason.

The ends of the sleeves 22 and 23, which extend into the interior of the extensions 19 and 20, have a stainless steel-to-graphite bearing attached to them to hold the respective sleeves in place against centrifugal forces, while permitting the sleeves 22 and 23 to rotate about the axes of the rotor blades 14 and 15 for pitch adjustments of the rotor blades. The bearings are formed by fixedly attaching stainless steel rings 26 and 27 over the inner ends of the sleeves 22 and 23, respectively. The stainless steel rings 26 and 27 may be attached by brazing, set screws, or any other suitable means to cause them to be firmly held in place on the ends of the sleeves 22 and 23 with sufficient force to withstand the centrifugal forces applied under the maximum speeds of rotation encountered by the rotor blades 14 and 15. These stainless steel cylindrical bands have an outer surface which is a segment of a sphere to permit limited vertical movement (of the order of five degrees) of the rotor blades 14 and 15, relative to the normal center line position which is perpendicular to the axis of the hollow rotor shaft 11.

The bearing surface for the stainless steel rings 26 and 27 is provided by respective mating graphite cylindrical bearings 30 and 31, each having a concave inner surface which engages the convex spherical segment surface of the corresponding stainless steel ring 26 or 27. The graphite used for the bearings 30 and 31, and for other graphite bearings disclosed herein, is a fine, dense grain structure made by extrusion and machined across the grain. It has a flexural strength greater than 20,000 psi and compressive strength greater than 40,000 psi. The bearings 30 and 31 are rigidly attached to the inner surfaces of the extensions 19 and 20, respectively, to provide a secure interconnection between the connecting sleeves 22 and 23 and the plenum chamber 10 to which the extensions 19 and 20 are attached. The graphite bearings 30 and 31 also are metal impregnated for strength and have a stainless steel band 32 heat-shrunk over their outside surface at an elevated temperature (greater than 550 degrees Fahrenheit) to place the graphite in tension. The graphite for the bearings 30 and 31 is very dense (greater than 40,000 psi tensile strength) to withstand the significant centrifugal forces of the rotor blades 14 and 15 in the operation of the helicopter. The spherical shape of the mating surfaces of the rings 26 and 27 with the respective bearings 30 and 31 provides trouble-free operation in all hot and cold environments. This shape permits such operation simply by slippage as growth or shrinkage of the respective mating surfaces of the elements 26/30 and 27/31 takes place with variations in the temperature in which these components are operated. The graphite of the bearings 30 and 31 functions to self-lubricate these bearings, and further acts as a tight air seal to prevent any leakage of air passing from within the plenum 10 into the hollow rotor blades 14 and 15 during operation of the helicopter. No additional air seals are necessary.

To permit axial rotation of the rotor blades 14 and 15 in conjunction with the control arms 40 and 41 (FIG. 1), in turn operated in conjunction with a conventional swash plate (not shown), a companion set of bearings, again using the graphite/stainless steel bearing configuration, are employed. These bearings are attached to a pair of cylindrical extensions 49 and 50 (shown most clearly in FIGS. 2 and 3). The extensions 49 and 50 are attached through flanges to corresponding mating flanges on the extensions 19 and 20, respectively, by means of a series of spaced tension springs 51 and 52, respectively, for the two different rotors 14 and 15, as illustrated in all of FIGS. 1 through 4. The springs 51 and 52 permit a slight lifting of the blades of the helicopter as caused by the coning effect during lift. This operation is described in greater detail subsequently.

Each of the two sets of bearings for permitting the rotational adjustment of the pitch of the blades 14 and 15 is similar to the bearings 26/30 and 27/31, which hold the rotor blades 14 and 15 in place against centrifugal forces. These additional sets of rotation adjustment bearings comprise stainless steel bands 56 and 57 bonded securely to the sleeves 22 and 23, respectively, in the locations shown most clearly in FIGS. 3, 4 and 10. The cross-sectional configuration of this section of the bearing is shown most clearly in FIG. 7 and comprises a spherical segment.

The bearing surface of these rotation adjustment bearings in this case does not encounter any significant stress since it is simply employed for purpose of permitting rotation of the rotor blades 14 and 15. This bearing surface, however, also is in the form of ring-shaped graphite bearings 59 and 60, respectively, each having a concave inner surface to mate with the convex outer surface of the stainless steel bands 56 and 57, attached to the sleeves 22 and 23, respectively. As with the bearings 26/30 and 27/31, the bearings 56/59 and 57/60 also include stainless steel bands 61 and 62, respectively, which are heat-shrunk onto the outside of the graphite to place it under tension. This increases the ability of these bearings to withstand forces applied to them through expansion of the stainless steel rings 59 and 60 during operation of the helicopter. Once again, a dense graphite similar to that used for the bearings 30 and 31 (but not requiring the metal impregnation) is used for the bearing material of the bearings 59 and 60. The bands 61 and 62 are secured to the housings 49 and 50, respectively. Thus, a simple graphite bearing connection between the plenum chamber 10 and the rotor blades 14 and 15 is effected which is capable of operating well under the high temperatures encountered. This bearing connection is self-lubricating and self-sealing to prevent any air leakage from taking place between the rotor blades and the plenum chamber 10.

Figures 5, 7, 8, 9:
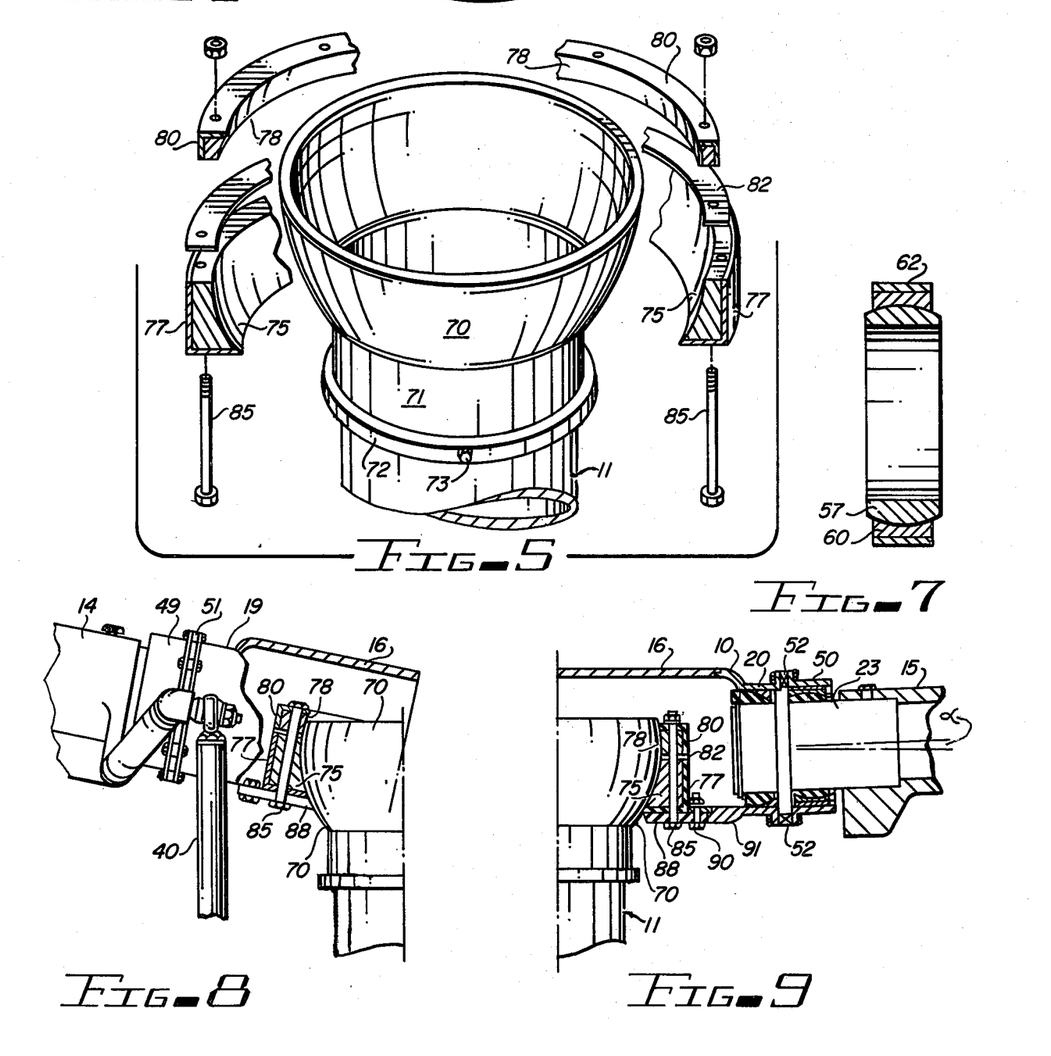
FIG. 5 is a partially cut-away exploded view of the hub and bearing portion of the embodiment shown in FIGS. 1 through 4.
FIG. 8 is a partially cut-away section view of a portion of the assembly shown in FIG. 3, illustrating the yaw movement for operating a helicopter using the hub assembly shown in the drawings.
FIG. 9 is a sectionalized detail view of a portion of the embodiment shown in FIG. 3 to illustrate the relationship of various parts when the rotor blade is in a coning angle during operation.

The type of construction which is described above for the interconnection of the rotor blades 14 and 15 to the rotor hub assembly utilizing stainless steel/graphite bearings also is employed for the rotor hub itself. The details of the rotor hub assembly are shown most clearly in FIGS. 3, 4, 5 and 10, to which reference now should be made. First of all, FIG. 5 is an exploded partially cut-away perspective view of the rotor hub assembly and the bearing construction which is utilized. The upper end of the rotor shaft 11 is externally threaded to permit the threaded attachment of an internally threaded, stainless steel, spherical ball section 70 to be attached to it. The stainless steel ball 70 is carried on the upper end of a short cylindrical neck 71 having a collar 72 on it. Once the ball 70 is screwed into place, as shown in FIGS. 3 and 5, one or more set screws 73 may be tightened to secure the stainless steel ball 70 in place against undesired rotation in either direction. The external surface of the ball 70 is a spherical segment, so that it has a circular radius. The entire ball 70 may be made of material capable of giving a good sealing surface to a graphite bearing, or it may be plated to present a very smooth sealing surface for a rotating graphite support bearing which is attached to the rotor blades. Ideal, long wearing plating for the ball 70 is hard chrome plating. This provides maximum wear resistance and lubricity properties for the graphite bearing used with it.

The graphite bearing itself is formed in two sections or two portions. The lower section of the bearing, the larger section, is formed of a ring-like segment of high density graphite 75 having a concave surface to mate with the convex outer surface of the ball 70. A stainless steel band 77 is heat-shrunk around the other three surfaces of the ring-shaped bearing 75 (as shown most clearly in FIG. 5). For a graphite bearing made of high density metal impregnated graphite and capable of operation at temperatures from minus 60 degrees to plus 550 degrees Fahrenheit, the stainless steel band 77 is heat-shrunk onto the graphite at greater than 650 degrees Fahrenheit. This is done because graphite is strong in tension and compression, but it is weak in hoop strength. The heat shrink is at a higher temperature than any temperature the bearing is subjected to in its use in the helicopter; so that at all times the graphite of the bearing 75 is compressed by virtue of the stainless steel band 77 and the pressure of the bearing surface against the ball 70 during operation of the helicopter. The surface of the bearing 75 which contacts the ball 70 is made very hard for maximum wear resistance by use of a standard silicon carbide coating on this surface.

The upper portion of the bearing includes a graphite bearing 78 which has a stainless steel band 80 heat-shrunk about it in the same manner as the band 77 around the bearing 75. From an examination of FIGS. 3 and 5, it can be seen that the two bearing portions 78 and 75 (which are made of identical material) have a common concave inner surface which is a segment of an inner spherical surface split at its center. A stainless steel ring 82 is imposed between the two bearing sections 75 and 78.

In the assembly of the structure, the lower bearing portion 75 first is placed over the upper end of the hollow rotor shaft 11. The ring 82 then is put in place; and the stainless steel ball 70 is threaded onto the end of the shaft 11 and secured, as described above. This places the portion 75 below the maximum diameter of the ball 70. The upper portion 78 of the bearing next is placed over the ring 82; and the two portions are secured together by means of a plurality of bolts 85, which extend upwardly through mating holes illustrated in FIG. 5 and which are secured in place by locking nuts.

As shown most clearly in FIG. 3, when the two halves 75 and 78 of the graphite bearing are secured in place by the bolts 85, the entire bearing assembly is supported by the hub 70. As reference to FIGS. 3, 8 and 9 also shows, the bolts 85 pass through a lower support ring 88, which is further attached by means of bolts 90 to the lower side 91 of the plenum chamber 10 to thereby attach the entire bearing support member, comprising the bearing sections 75 and 78 and ring 82 rigidly to the plenum chamber 10. As a consequence, the entire plenum chamber 10 and the rotors which are attached to it are free to rotate about the ball 70 in the end of the hollow rotor shaft 11, thus forming the rotor hub system for the helicopter. The high-temperature, high-strength graphite bearing portions 75 and 78 provide a self-lubricating, relatively low friction interface with the highly polished hard chrome surface of the stainless steel ball 70. In addition, a very tight air seal also is effected when the helicopter is in use due to the tight engagement of the inner surface of the bearing segment 75 against the lower portion of the ball 70 when the helicopter is lifted by the rotors 14 and 15.

Because high temperature graphite bearings are employed throughout the interconnections of the rotors with the sleeves 22 and 23, as well as for the critical rotor hub system comprising the ball 70 and the bearing sections 75 and 78, a superior system, compared to systems employing conventional ball bearings, results. The self-lubricating characteristics of the graphite overcome the disadvantages previously present with ball bearings in the presence of the hot gases passing through the hollow rotor shaft and into the rotors. No drying out of lubrication is present since the graphite bearings are self-lubricating. In addition, the disadvantages of separate seals to prevent air leakage, with the wear and friction presented by such seals, is not present in the structure which is shown and described in the drawings. The helicopter works as well in extremely cold conditions, for example as are encountered in the winter in Alaska, or the like, as it does in fully warmed-up operation.

The slight gap between the two bearing halves 75 and 78 which is effected by the ring 82 permits growth of the bearing about the ball 70 as the ball grows when heat is generated in the operation of the helicopter. The stainless steel of the ball 70 has a coefficient of expansion which is greater than that of the graphite. This is the reason the graphite bearing segments 75 and 82 are placed on the outside of the ball 70, rather than vice versa. In addition, as the ball expands relative to the bearing portions 75 and 78, it places the bearing in a greater compression due to the confinement of the stainless steel bands 77 and 80. Since graphite is strong in compression and weak in hoop strength, this is an additional reason for placing the graphite rotor support bearing on the outside of the ball 70.

Utilizing the rotor hub assembly, which is described above and illustrated in the drawings, results in an elimination of ball bearings from all of the critical air flow areas. Thus, either hot air or cold air can be used to drive the rotor blades and an absolute free-wheeling aspect of the blades relative to the rotor shaft 11 is present. As a consequence, the kinetic energy which is built up during flight of the helicopter permits the helicopter to descend slowly in case of a power failure, thereby preventing uncontrolled falls.

Reference now should be made to FIG. 8 which illustrates the relative position of the rotating plenum chamber 10 and the graphite bearing sections 75 and 78 when the control arms 40 and 41 are moved by the swash plate to effect a tilting of the rotor. As can be seen from FIG. 8, this simply places the bearing sections 75 and 78 further upward on one side of the ball 70 (the side which is shown in FIG. 8), and lower on the ball on the opposite side (not shown). Since the external surface of the ball 70 and the concave mating surfaces of the bearings sections 75 and 78 are spherical, this movement permits an intimate and continuous engagement between the bearing surfaces and the ball 70 throughout the angle of tilt which is effected.

Figure 10:
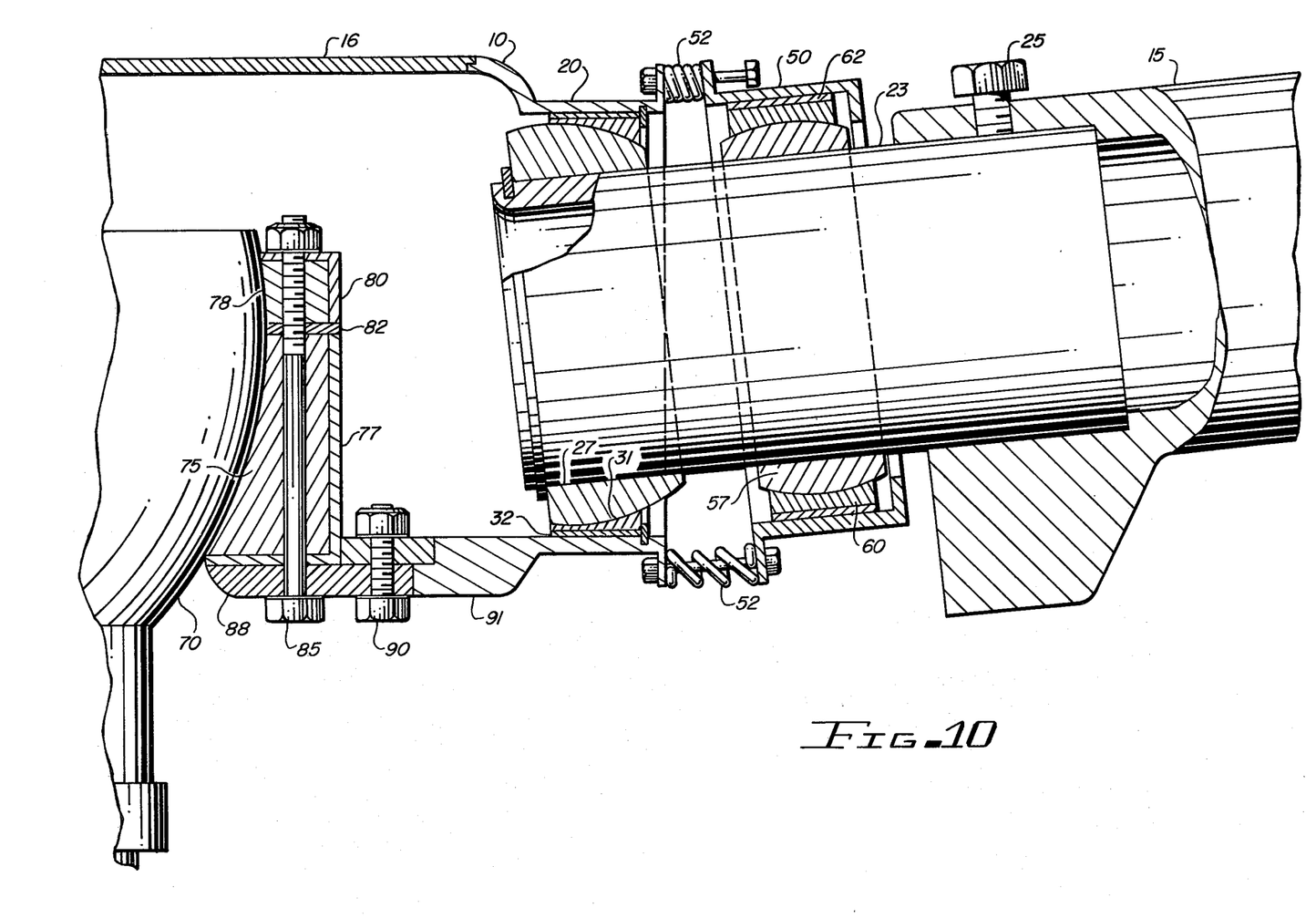
FIG. 10 is an enlargement of a portion of FIG. 9 to show details thereof.

In FIGS. 9 and 10, the relative positions which are assumed by the rotor blades (blade 15 being illustrated) in flight due to the coning effect during lift with respect to the rotating plenum chamber 10 is shown. The plenum chamber 10 and the bearing sections and other parts which are rigidly attached to it are shown in FIG. 9 as having a horizontal configuration which is perpendicular to the vertical axis of the hollow rotor shaft 11. This is a configuration essentially for level lift or landing of the helicopter. A substantial force on the ends of the rotor blade, however, causes a tendency for the blade to lift upwardly. The springs 52 (and similarly 51 for the rotor blade 14), which interconnect the extension 20 with the housing 50, are subjected to this force. This results in a compression of the springs 52 located at the top and an extension or stretching of the springs 52 located at the bottom of the interconnection as illustrated in FIG. 9. Thus, the rotor blade 15 assumes a slight angle, alpha, of the order of 5 degrees or so, which is illustrated in FIG. 9, with respect to the normal center line of the rotor blade 15. The orientation and shape of the bearing 27/31 (FIG. 6) permits this movement to take place while still holding the rotor blade firmly against centrifugal force. The dotted line configuration of the ring 27 relative to the graphite bearing portion 31 of the stainless steel ring/graphite bearing combination 27/31 as shown in FIG. 6 illustrates the relative arrangement of these parts when coning takes place.

The foregoing description is of a preferred embodiment as illustrated in the various figures of the drawings. This embodiment, however, is to be considered illustrative only of the features of the invention and is not to be considered restrictive. Various modifications, different arrangements of parts, and other changes will occur to those skilled in the art without departing from the true scope of the invention. For example, the inner surface of the cover plate 16 could have a generally conical shape 18 as indicated in dotted lines in FIG. 3 to assist in a smooth air flow passage from the hollow rotor shaft 11 to the ends of the rotor blades 14 and 15.

I claim:

1. In an air-driven helicopter having an air frame, a hollow rotor shaft rigidly mounted in the helicopter air frame and extending upwardly therefrom, a rotor hub system attached to the shaft for supporting a set of hollow rotor blades and conveying a flow of pressurized air from the shaft to the blades, and an air pressure source mounted in the air frame for delivering a flow of pressurized air to the hollow rotor shaft; an improvement in said rotor hub system including in combination:

a hollow spherical section support member fixedly attached to the upper end of the hollow rotor shaft for permitting air flow therethrough from the rotor shaft;

a combined rotor support, seal, and bearing member, made of high-density graphite having an internal concave spherical surface matingly engaging the external surface of said spherical section support member for rotation thereabout, and comprising the sole bearing and support between rotor hub system and the rotor shaft, said graphite rotor support bearing member being self-lubricating material; and means for attaching the rotor blades to said rotor support bearing member.

2. The combination according to claim 1 wherein said hollow spherical section support member is made of metal and said rotor support, seal and bearing member has at least the surface thereof which engages the external surface of said hollow spherical section support member made of graphite to provide a self-lubricating bearing surface in contact with said metal hollow spherical section support member.

3. The combination according to claim 2 wherein said hollow spherical section support member is a section of a spherical ball.

4. The combination according to claim 2 wherein said hollow spherical section support member is a section of a stainless steel ball.

5. The combination according to claim 3 wherein said spherical ball section is internally threaded, and the upper end of the hollow rotor shaft is externally threaded with said ball section screwed into the end of the hollow rotor shaft for attachment thereto.

6. The combination according to claim 5 wherein said graphite rotor support, seal and bearing member is constructed in the form of two generally ring-shaped portions, comprising a lower portion and an upper portion, which together form a substantially continuous bearing surface on said hollow spherical section support member, with the facing surfaces of said upper and lower portions lying in a plane bisecting the sphere of which said lower and upper portions of said rotor support, seal and bearing member are formed.

7. The combination according to claim 6 further including a ring-shaped spacer between said upper and lower portions of said rotor support, seal and bearing member; and means for interconnecting said upper and lower portions of said support, seal and bearing member and said spacer ring together on said hollow spherical section support member.

8. The combination according to claim 4 wherein said spherical ball section is internally threaded, and the upper end of the hollow rotor shaft is externally threaded with said ball section screwed onto the end of the hollow rotor shaft for attachment thereto.

9. The combination according to claim 8 wherein said graphite rotor support, seal and bearing member is constructed in the form of two generally ring-shaped portions, comprising a lower portion and an upper portion, which together form a substantially continuous bearing surface on said hollow spherical section support member, with the facing surfaces of said upper and lower portions lying in a plane bisecting the sphere of which said lower and upper portions of said rotor support, seal and bearing member are formed.

10. The combination according to claim 9 further including a ring-shaped spacer between said upper and lower portions of said rotor support, seal and bearing member; and means for interconnecting said upper and lower portions of said support, seal and bearing member and said spacer ring together on said hollow spherical section support member.

11. The combination according to claim 2 wherein said rotor support, seal and bearing member is comprised of graphite having a fine, dense grain structure made by extrusion and machined across the grain with a flexural strength greater than 20,000 psi and compressive strength greater than 40,000 psi.

12. The combination according to claim 1 wherein said rotor support, seal and bearing member is made of graphite with a concave graphite bearing surface for engaging the exterior surface of said hollow spherical section support member; and further including a stainless steel wrap-around housing heat shrunk onto the graphite on at least the surface opposite the surface engaging said hollow spherical section support member.

13. The combination according to claim 12 wherein said hollow spherical section support member is a section of a stainless steel ball.

14. The combination according to claim 13 wherein said spherical ball section is internally threaded, and the upper end of the hollow rotor shaft is externally threaded with said ball section screwed onto the end of the hollow rotor shaft for attachment thereto.

15. The combination according to claim 14 wherein said graphite rotor support, seal and bearing member is constructed in the form of two generally ring-shaped portions, comprising a lower portion and an upper portion, which together form a substantially continuous bearing surface on said hollow spherical section support member, with the facing surfaces of said upper and lower portions lying in a plane bisecting the sphere of which said lower and upper portions of said rotor support, seal and bearing member are formed.

16. The combination according to claim 15 further including a ring-shaped spacer between said upper and lower portions of said rotor support, seal and bearing member; and means for interconnecting said upper and lower portions of said support, seal and bearing member and said spacer ring together on said hollow spherical section support member.

17. The combination according to claim 7 wherein the axes of the hollow rotor blades are substantially in the same plane as the plane of said spacer ring between said first and second portions of said rotor support, seal and bearing member.

18. The combination according to claim 1 further including means above the open end of the hollow rotor shaft and said hollow spherical section support member and coupled with said rotor blade attaching means for providing an enclosed air chamber between the hollow rotor shaft and the hollow rotor blades for supplying air from the hollow rotor shaft to the hollow rotor blades, wherein said rotor support, seal and bearing member provides an air-tight seal with said hollow spherical section support member.

19. The combination according to claim 18 further including graphite bearing means for permitting rotation of the hollow rotor blades within said attaching means and for permitting limited tilt of the axes of the rotor blades with respect to the plane in which said spacer means lies to accomodate the coning effect of the rotor blades during lift.

20. The combination according to claim 18 werein said means for attaching each of the rotor blades to said rotor support, seal and bearing member includes first and second substantially cylindrical graphite bearing means on the end of the rotor blade shaft in proximity with said rotor support, seal and bearing member, with a first portion of each cylindrical bearing means attached in a non-rotational manner to said rotor support, seal and bearing member and a second portion of each cylindrical bearing means rigidly attached for rotation with the shaft of the rotor blade; and flexible means interconnecting the first portions of said first and second cylindrical bearings to permit limited vertical movement of the rotor blades pivoting about said first cylindrical bearing means to accomodate coning effect.

21. The combination according to claim 7 further including means above the open end of the hollow rotor shaft and said hollow spherical section support member and coupled with said rotor blade attaching means for providing an enclosed air chamber between the hollow rotor shaft and the hollow rotor blades for supplying air from the hollow rotor shaft to the hollow rotor blades, wherein said rotor support, seal and bearing member provides an air-tight seal with said hollow spherical section support member.

22. The combination according to claim 21 further including graphite bearing means for permitting rotation of the hollow rotor blades within said attaching means and for permitting limited tilt of the axes of the rotor blades with respect to the plane in which said spacer means lies to accomodate the coning effect of the rotor blades during lift.

23. The combination according to claim 22 wherein said means for attaching each of the rotor blades to said rotor support, seal and bearing member includes first and second substantially cylindrical graphite bearing means on the end of the rotor blade shaft in proximity with said rotor support, seal and bearing member, with a first portion of each cylindrical bearing means attached in a non-rotational manner to said rotor support, seal and bearing member and a second portion of each cylindrical bearing means rigidly attached for rotation with the shaft of the rotor blade; and flexible means interconnecting the first portions of said first and second cylindrical bearings to permit limited vertical movement of the rotor blades pivoting about said first cylindrical bearing means to accomodate coning effect.

24. The combination according to claim 23 further including means coupled with the means for attaching the rotor blades to said rotor support, seal and bearing member and spaced above the opening in the end of the hollow rotor shaft and said hollow spherical section support member for forming an air chamber to guide air flow from the hollow rotor shaft to the hollow rotor blades for exiting therefrom.

25. The combination according to claim 24 wherein said graphite rotor support, seal and bearing member and said first and second cylindrical graphite bearing means provide the sole air sealants between the moving parts of said rotor hub system for air passing through the hollow rotor shaft to the rotor blades.

26. The combination according to claim 25 further including means for pivoting said rotor support, seal and bearing member about said hollow spherical section support member to tilt the rotor blades to planes other than a plane perpendicular to the axis of the hollow rotor shaft.

27. The combination according to claim 1 wherein said hollow spherical section support member comprises the sole support for the rotor blades through said rotor support, seal and bearing member to which the rotor blades are attached to provide complete rotational free wheeling of the rotor blades with respect to the hollow spherical section support member.

28. The combination according to claim 26 wherein said hollow spherical section support member comprises the sole support for the rotor blades through said rotor support, seal and bearing member to which the rotor blades are attached to provide complete rotational free wheeling of the rotor blades with respect to the hollow spherical section support member.

* * * * *